Figure 1:
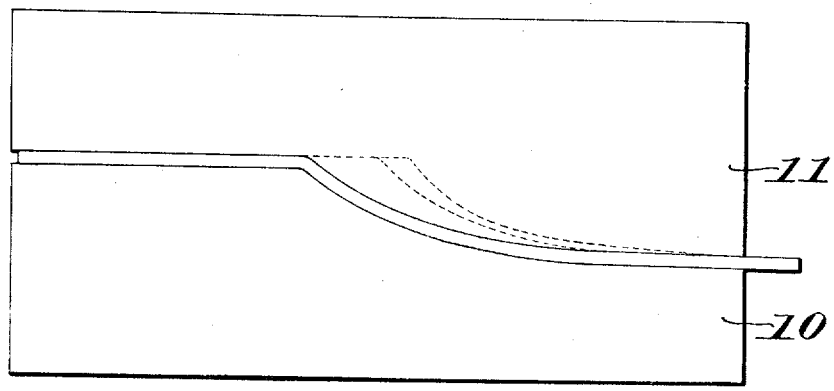

J. J. HEYS.
METHOD OF MOLDING SHEETS OF LEATHER AND ANALOGOUS MATERIAL.
APPLICATION FILED JULY 1, 1918.

1,296,518.

Patented Mar. 4, 1919.

UNITED STATES PATENT OFFICE.

JOHN J. HEYS, OF LYNN, MASSACHUSETTS, ASSIGNOR TO UNITED SHOE MACHINERY CORPORATION, OF PATERSON, NEW JERSEY, A CORPORATION OF NEW JERSEY.

METHOD OF MOLDING SHEETS OF LEATHER AND ANALOGOUS MATERIAL.

1,296,518.   Specification of Letters Patent.   Patented Mar. 4, 1919.

Original application filed May 7, 1915, Serial No. 26,551. Divided and this application filed July 1, 1918. Serial No. 242,703.

*To all whom it may concern:*

Be it known that I, JOHN J. HEYS, a citizen of the United States, residing at Lynn, in the county of Essex and Commonwealth of Massachusetts, have invented certain new and useful Improvements in Methods of Molding Sheets of Leather and Analogous Material; and I do hereby declare the following to be a full, clear, and exact description of the invention, such as will enable others skilled in the art to which it appertains to make and use the same.

The present invention relates to a method of molding sheets of leather and analogous material, and is more particularly applicable to the shaping of soles for boots and shoes.

The object of the invention is to enable sheets of leather and analogous material to be molded into difficult shapes, which may have abrupt bends or sharp curves, and to accomplish this molding of the sheet without breaking or straining the fibers or otherwise damaging the material.

The new and successful method which secures the attainment of this object consists in subjecting a flat sheet of leather or analogous material to a series of progressively increased pressures between coöperating pressing members with an intermediate relief of pressure separating the increased pressures.

In the molding of outsoles of boots and shoes it has been heretofore impossible to secure certain shapes, in which, for example, the ball line is defined by a sharp break in the sole, without seriously straining the fibers of the sole, and which resulted usually in breaking certain of the fibers at the surface of the sole, weakening the strength of the sole and impairing the appearance. This resulted from the fact that it was necessary to apply an excessively heavy pressure to mold the sole into the desired form, and the material of which the sole was made was in consequence incapable of withstanding the strains imposed upon it. According to the present method, the sole or sheet of leather in its initial flat condition is first subjected to a comparatively light pressure, which does not impose too great a strain upon the fibers, and this pressure is then relieved, permitting the fibers which have been strained to partially return to their initial condition. The pressure is then increased, and thereafter relieved, to gradually mold the sheet of leather into the desired final shape, without at any time stretching the fibers to the breaking point. This method of molding produces uniformly successful results, and permits molding of the most difficult shapes from the flat sheet of material.

Figure 2:
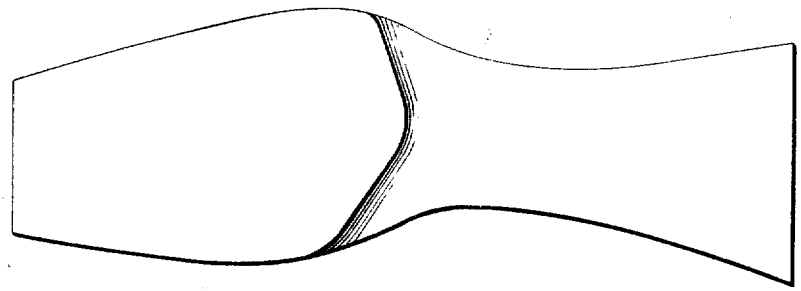

In the accompanying drawings, which represent one type of work formed by this method, Figure 1 represents an outsole engaged between two coöperating pressing members, and Fig. 2 represents a plan view of the outsole in its final molded condition, and illustrating clearly the sharp break which separates the ball from the shank of the sole.

The present invention, when employed for shaping outsoles, may be practised by a machine of the type disclosed in the application of Heys, Serial No. 26,551, filed May 7, 1915, and from which this invention is divided.

As shown in the drawings, the outsole is interposed between a pair of coöperating molds 10 and 11, which are designed to produce a finished sole having the characteristic appearance indicated in Fig. 2. This type of sole, from the standpoint of appearance, is extremely desirable, but prior to the present method, could not be produced without a serious weakening of the material, due to breaking of the fibers particularly in the region surrounding the ball line. These broken fibers not only weakened the sole, but seriously detracted from the finished appearance, as the fibers subjected to the greatest strain were those lying in the tread face of the sole.

According to the present method, the molding of the sole is initiated by forcing the two pressing members together under a comparatively light pressure, which is then relieved and succeeded by a heavier pressure, after which the pressure is again relieved, the number of increased pressures to which the work is subjected being governed by the character of the work and the desired shape to be imparted to the sheet.

In the cycle of operations performed by the machine above referred to, and which has been found to work well in practice, the sole is first subjected to a comparatively light pressure, which is then relieved and a second and heavier pressure applied. The sole is subjected to this heavier pressure for an indeterminate length of time, after which the pressure is relieved, and the sole finally subjected momentarily to a final and heaviest pressure, which completes the molding operation.

It will be obvious to those skilled in the art that although this method is particularly adapted as shown to the molding of shoe soles from leather, it may well be adapted to the shaping of other articles from leather and materials of an analogous nature.

I claim—

1. A method of molding soles which consists in subjecting a flat sheet of leather or analogous material to a series of progressively increased pressures between suitable shaping members with an intermediate relief of pressure separating the increased pressures.

2. A method of molding soles which consists in subjecting a flat sheet of leather or analogous material to a series of progressively increased pressures between coöperating molds with an intermediate relief of pressure separating the increased pressures.

3. A method of shaping soles which consists in subjecting a flat sole blank of leather or analogous material to a comparatively light pressure between coöperating shaping members, relieving the pressure exerted by the shaping members, and thereafter increasing the pressure upon the sole to mold the sole blank to the desired shape in a plurality of steps.

4. A method of shaping soles which consists in subjecting a flat sheet of leather or analogous material to an initial comparatively light pressure between coöperating shaping members, relieving the pressure exerted by the shaping members, next applying an increased pressure for an indeterminate period, and thereafter relieving the pressure and applying a final and heaviest pressure.

JOHN J. HEYS.